United States Patent
Rand et al.

(10) Patent No.: US 8,296,258 B2
(45) Date of Patent: Oct. 23, 2012

(54) AUTOMATED CHANNEL MARKET DATA EXTRACTION, VALIDATION AND TRANSFORMATION

(75) Inventors: Nahum Rand, Las Vegas, NV (US); Vineet Joshi, Aurora, CO (US); Irwin Rosenblum, Sacramento, CA (US)

(73) Assignee: InfoNow Corporation, Denver, CO (US)

(*) Notice: Subject to any disclaimer, the term of this patent is extended or adjusted under 35 U.S.C. 154(b) by 761 days.

(21) Appl. No.: 12/130,582

(22) Filed: May 30, 2008

(65) Prior Publication Data

US 2009/0327452 A1 Dec. 31, 2009

Related U.S. Application Data

(60) Provisional application No. 60/941,554, filed on Jun. 1, 2007.

(51) Int. Cl.
*G06F 15/16* (2006.01)
(52) U.S. Cl. .................................. 707/602; 707/949
(58) Field of Classification Search .................. 707/600, 707/601, 602, 705, 912, 944, 948, 783, 949; 705/7.29–7.32, 22–23, 26.2, 28; 709/219
See application file for complete search history.

(56) References Cited

U.S. PATENT DOCUMENTS

| | | | | |
|---|---|---|---|---|
| 5,970,476 A * | 10/1999 | Fahey | ............................. | 705/28 |
| 6,014,670 A * | 1/2000 | Zamanian et al. | ...................... | 1/1 |
| 6,584,467 B1 * | 6/2003 | Haught et al. | ......................... | 1/1 |
| 7,003,560 B1 * | 2/2006 | Mullen et al. | .................. | 709/223 |
| 7,051,334 B1 | 5/2006 | Porter et al. | | |
| 7,299,216 B1 | 11/2007 | Liang et al. | | |
| 7,676,478 B2 * | 3/2010 | Rausch | ...................... | 707/999.1 |
| 7,681,185 B2 * | 3/2010 | Kapoor et al. | ................. | 717/140 |
| 7,720,804 B2 * | 5/2010 | Fazal et al. | ..................... | 707/601 |
| 2003/0033179 A1 * | 2/2003 | Katz et al. | ......................... | 705/7 |
| 2007/0265926 A1 * | 11/2007 | Ohmann et al. | ................ | 705/26 |

* cited by examiner

*Primary Examiner* — Shahid Alam
*Assistant Examiner* — Evan Aspinwall
(74) *Attorney, Agent, or Firm* — Martensen IP; Michael C. Martensen (57) ABSTRACT

Select portions of product channel data collected by a product channel participant and stored in a data warehouse are periodically extracted based on a previously determined template. The extracted subset of product channel data is thereafter transformed so that the format of the data complies with that of the requesting enterprise. Once transformed, one or more rule sets is applied to the subset of transformed data to guarantee that the information complies with requirements set forth by the enterprise yet does not violate any disclosure rules of the product channel participant. Thereafter and on a scheduled basis, the transformed and validated data is delivered to a delivery server from which the enterprise can retrieve the data at its convenience.

20 Claims, 4 Drawing Sheets

AUTOMATED CHANNEL MARKET DATA EXTRACTION, VALIDATION AND TRANSFORMATION

RELATED APPLICATION

The present application relates to and claims the benefit of priority to U.S. Provisional Patent Application No. 60/941,554 filed Jun. 1, 2007, which is hereby incorporated by reference in its entirety for all purposes as if fully set forth herein.

BACKGROUND OF THE INVENTION

1. Field of the Invention

Embodiments of the present invention relate, in general, to the extraction, transformation and loading of data and particularly to an automated system for extraction, transformation and transmission (loading) of channel market data.

2. Relevant Background

A data warehouse, as is known in the art, is a central repository for all or significant parts of data that an enterprise's various business systems collect. Typically, a data warehouse is housed on an enterprise server computing system. In such a system, data from various sources is selectively extracted and organized on the data warehouse database for use by analytical applications and user queries by the enterprise.

It is known in the art that in managing databases, "extract, transform and load" (ETL) refers to three separate functions combined into a single program procedure. First, the extract function reads data from a specified source database and extracts a desired subset of data. Next, the transform function works with the acquired data—using rules or lookup tables, or creating combinations with other data—to convert it to the desired state. Finally, the load function is used to write the resulting data (either the entirety of the subset or only the changes) to a target database, which may or may not previously exist. ETL procedures can be used to acquire a subset of data for reports or other purposes, such as the migration of data from one database or platform to another.

In a channel market environment, a end seller of goods and services may transact with a number of manufacturers to provide the end buyer (also referred to herein as buyer) with a wide selection of products and services (collectively referred to herein as goods). As these goods are sold, the end seller communicates to the manufacturer, normally through a distributor, that additional goods are necessary and desired. In one scenario, the manufacturer moves to supply the increased demand. In other scenarios, the varying demand curve is resolved by stock maintained by the distributor, and only when the distributor's stockpiles are low does the manufacturer recognize the need for additional products.

A long felt need by the manufacturer in the channel economy is buyer data with respect to their product. Data from the end seller with respect to what type of buyer ultimately is purchasing a particular type of product is often unavailable to the manufacturer. Even when such data is available, the process by which to convey it to the manufacturers is tedious and costly. Thus the manufacturer relies heavily on information from the distributors whose buyer data may or may not be accurate or complete. Only data gained via an end seller can be assured to be complete and accurate.

Conveying sensitive data with respect to sales is not without risk. While this type of data is critical for the manufacturer to implement strategic plans with respect to product modifications, future research, product development, sales commission, allocation of market development funds, etc., it also may allow a manufacturer to circumvent the role of a distributor or even the retailer. In today's environment of on-line shopping, the brick and mortar stores are not only in competition with across town rivals but with on-line sales and distribution of a product from the manufacturers themselves.

To address the need for channel data, manufacturers, in return for a discount on their product, often negotiate with distributors and retailers alike. In such a negotiation, the distributor or end seller would provide to the manufacturer key information that helps facilitate the production and development of more marketable goods without undermining either the distributor's or retailer's role in the channel. Data that is submitted to the manufacturer typically must follow a rigid format usable by the manufacturer and is but a small subset of the data housed by the providing entity.

From the retailer's, reseller's, agent's, or distributor's (collectively referred to herein as Partners) data warehouse, select pieces of information are extracted, transformed and then conveyed to the manufacturer or suppliers (collectively referred to herein as Suppliers). While ETL tools exist to aid in the process, there remain many tedious and time consuming tasks. For example, providers of the data are understandably reluctant to provide a Supplier or a similar entity access to their entire data warehouse due to the extent of sensitive data contained therein. Thus, even with current ETL tools, many providers manually verify that the information being sent to a particular Supplier does not contain sensitive information prior to it leaving the provider's confines. Similarly, there is a question of timeliness. Data of this sort is very time sensitive, thus the Supplier desires and often demands that the data be conveyed on a regular basis. While compiling this sort of information for a single Supplier on a reoccurring basis may be possible, the problem is compounded as most channel Partners offer a variety of goods from a variety of Suppliers, each of which desires specific and dissimilar data in dissimilar formats. Thus extracting, validating, transforming and conveying channel data about a multitude of goods to a plurality of unique providers on a timely basis remains a challenge.

SUMMARY OF THE INVENTION

Embodiments of the present invention include systems and methods for extracting, transforming and conveying product channel data to a plurality of enterprises according to specific formats. According to one embodiment of the present invention, portions of product channel data collected by a product channel participant and stored in a data warehouse are periodically extracted based on a predetermined template. The extracted subset of product channel data is transformed so that the format of the data complies with that of the requesting enterprise. Once transformed, one or more rule sets is applied to the subset of transformed data to ensure that the information complies with requirements set forth by the enterprise yet does not violate any disclosure rules of the product channel participant. Thereafter and on a scheduled basis, the transformed and validated data is delivered to a delivery server from which the enterprise can retrieve the data at its convenience.

The features and advantages described in this disclosure and in the following detailed description are not all-inclusive. Many additional features and advantages will be apparent to one of ordinary skill in the relevant art in view of the drawings, specification and claims hereof. Moreover, it should be noted that the language used in the specification has been principally selected for readability and instructional purposes and may not have been selected to delineate or circumscribe the inventive subject matter; reference to the claims is necessary to determine such inventive subject matter.

BRIEF DESCRIPTION OF THE DRAWINGS

The aforementioned and other features and objects of the present invention and the manner of attaining them will become more apparent, and the invention itself will be best understood, by reference to the following description of a preferred embodiment taken in conjunction with the accompanying drawings, wherein.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

A system for automated delivery of product channel data is herein disclosed. According to one embodiment of the present invention, an enterprise can gain, at its convenience, product channel data periodically deposited on a server by a product channel participant.

Specific embodiments of the present invention are hereafter described in detail with reference to the accompanying Figures. Like elements in the various Figures are identified by like reference numerals for consistency. Although the invention has been described and illustrated with a certain degree of particularity, it is understood that the present disclosure has been made only by way of example and that numerous changes in the combination and arrangement of parts can be resorted to by those skilled in the art without departing from the spirit and scope of the invention.

Figure 1:
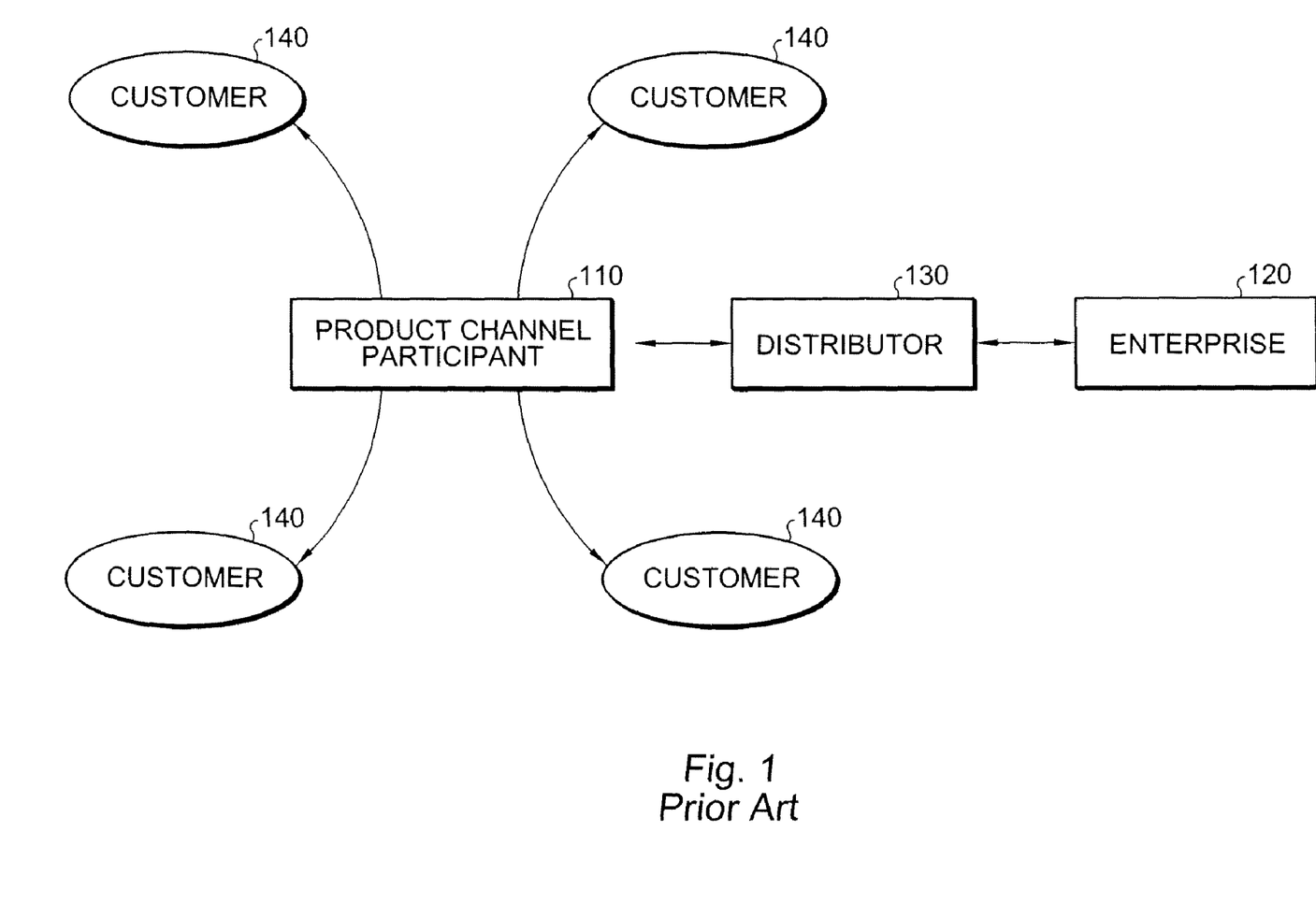
FIG. 1 is a high level block diagram of a product channel market as is known in the prior art.

During the normal course of business, a product channel participant interacts with several enterprises. Many of these enterprises produce and supply goods to a product channel participant who in turn conveys the goods to customers. FIG. 1 shows a high level block diagram of a product channel market as is known in the prior art. A product channel participant 110 receives a product from an enterprise 120 normally via one or more distributors 130. Thereafter the product channel participant 110 sells the product to a plurality of customers 140. Data regarding these sales is vital to an enterprise 120 yet, as previously discussed, there is an inherent reluctance on the part of the channel participant 110 to be completely open with its product channel data.

Figure 2:
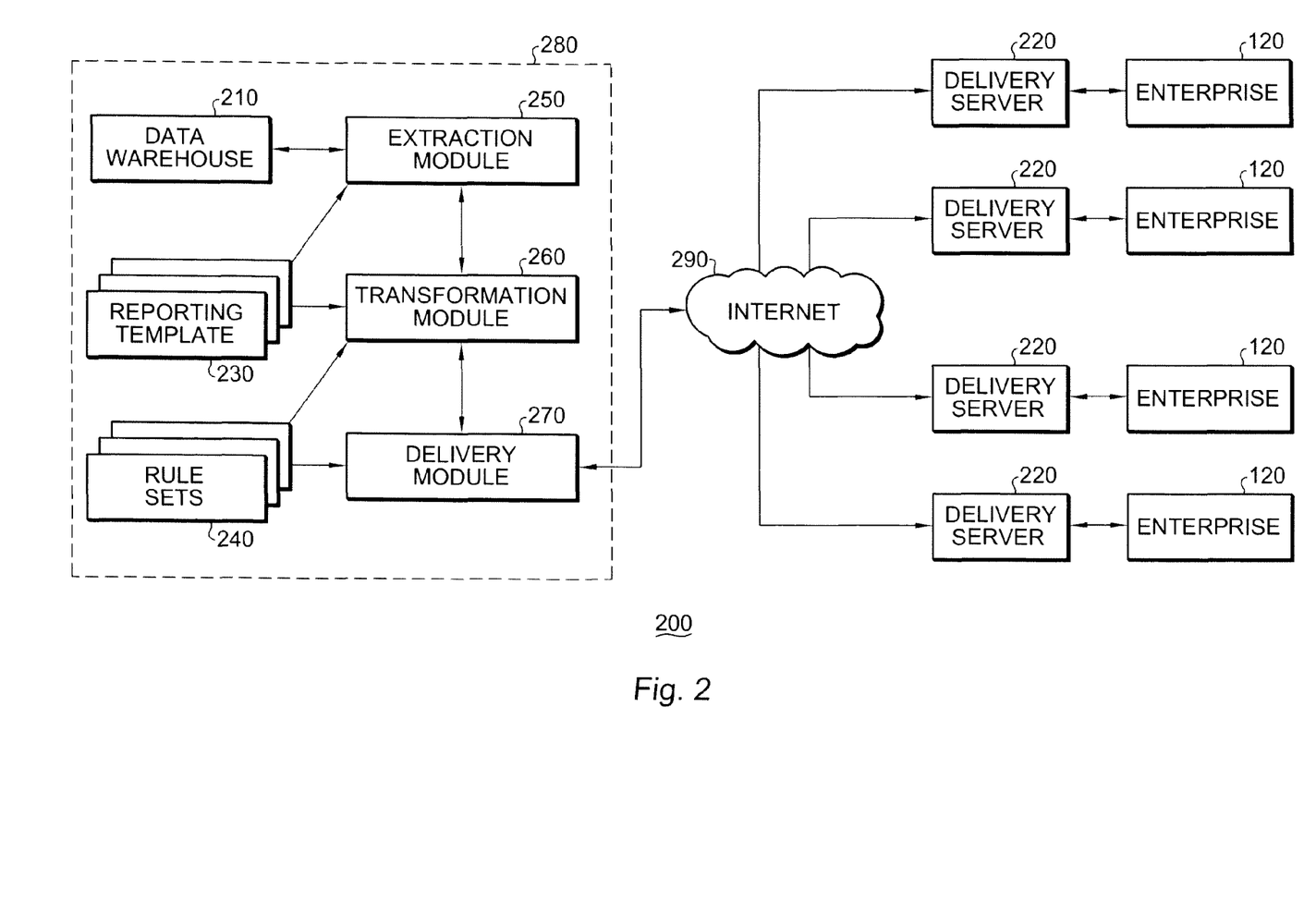
FIG. 2 is a high level block diagram for an automated system of product channel data according to one embodiment of the present invention.

According to one embodiment of the present invention and as shown in FIG. 2, an automated product channel delivery system 200 extracts predetermined portions of the product channel data from a data warehouse forming a subset of product channel data and thereafter transforms that subset into a format dictated by the enterprise. Once extracted and transformed, the system 200 validates the data by confirming that it includes required content as indicated by the enterprise 120 and lacks content deemed confidential by the product channel participant 110. Responsive to the transformed subset of product channel data being validated, the data is transferred or delivered periodically to a repository on a server 220 via the Internet 230.

The server 220, according to one embodiment of the present invention, is coupled to a wide area network such as the Internet 230 and is interposed between the Internet 230 and the enterprise 120. In one embodiment, the server 220 and remainder of the system 200 is resident at the product channel participant 110. However, one skilled in the relevant art will appreciate that the system 200 can exist apart from the product channel participant and server 220 without departing from the scope of the present invention as is described below.

As shown in FIG. 2, a data warehouse 210, a plurality of reporting templates 230, a plurality of rule sets 240, an extraction module 250, a transformation module 260 and a delivery module 270 are set apart from the delivery server 220 and the Internet 230 by a firewall 280. Each of the aforementioned elements of the present invention is communicatively coupled so as to produce a transformed and validated set of product channel data that can be delivered via the delivery module 270 to the delivery server 220. Delivery begins with identification and extraction of key product channel data from the data warehouse 210.

The extraction module 250 retrieves a reporting template 230 from a persistent storage media maintained within the system 200. Each template is a list of product channel data desired for a specific enterprise. As will be appreciated by one skilled in the relevant art, the data collected by the channel participant and stored in the data warehouse possesses a great deal of detail beyond that which is of interest to a typical enterprise. In addition, data with respect to goods from other competing enterprises may be present in the same data warehouse, and while such data is likely desirable to an enterprise, its disclosure would breach the confidences established with other vendors.

The reporting templates 230 thus assist the extraction module in identifying what aspects of the data warehouse are of interest to a particular enterprise without violating the confidences of any other business partner. Generally and according to one embodiment of the present invention, an enterprise 120 submits a list of desired product channel data and a format in which the data should be delivered. This list is examined by the product channel participant or similar entity that verifies that the request is not for inappropriate data and that the data actually exists within the data warehouse 210 or can be determined from existing data. A reporting template 230 is then prepared that is compatible with the data warehouse 210 and that can be used by the extraction module 250 to retrieve the desired bits of data.

As shown in FIG. 2, the transformation module 260 is communicatively coupled with the extraction module 250 and the reporting template 230 repository. According to one embodiment of the present invention, data based on a reporting template 230 that is periodically extracted from the data warehouse 210 by the extraction module 250 is then acted upon by the transformation module 260. Using either the same template that aided the extraction module 250 in retrieving the data or another template specifically designed for the transformation process, the transformation module 260 modifies the format of the data from its present format (i.e. as it is found in the data warehouse 210) to a format compatible to a particular enterprise system.

Turning back to FIG. 2, it can be seen that the validation and transformation module 260 also is communicatively coupled with a repository of rule sets 240. According to one embodiment of the present invention, validated and transformed product channel data must be validated prior to being delivered to the Supplier. One aspect of the validation process is confirming that the transformed data includes elements of product channel data required by the Supplier. As previously discussed, an Supplier typically identifies data that is both desired and required. While many of these fields correlate on a one-to-one basis with data housed in the data warehouse 210, some fields may nonetheless be unsupported. In addition to validating and transforming extracted data from the data warehouse 210, the validation and transformation module 260, according to one embodiment of the present invention, modifies and/or combines existing data from the data warehouse 210 to create fields of product channel data required by a Supplier.

In addition to ensuring that the validated and transformed data from the transformation module 260 includes Supplier required data, another rule set, according to another embodiment of the present invention, confirms that additional data that is neither required nor desired is not included in the report. Once the product channel data extracted from the data warehouse 210 has been validated and transformed, it is conveyed to the delivery module 270. According to one aspect of the present invention, the extraction, validation, transformation and delivery of product channel data occurs on a regular and/or scheduled basis. As it is an automated process, the delivery of validated and transformed data can occur with little to no user interaction.

The delivery module 270 serves as a conduit for all data leaving the confines of the firewall 280. Prior to data being placed on the delivery server 220 that is outside the firewall 280, the delivery module 270 establishes a record of what data has been prepared by the system 200 and what data has been sent to the delivery server 220 via the Internet 230. According to one embodiment of the present invention, upon receipt of particular communication of transformed product channel data, the delivery server 220 communicates with the delivery module 270 confirming the transfer. The delivery module 270 thereafter records in a log or similar record that certain fields of data with respect to a particular enterprise 120 have been communicated successfully to the delivery server 220.

As shown in FIG. 2, a plurality of delivery servers 220 are in communication with a corresponding plurality of enterprises 120. According to another embodiment of the present invention, once an enterprise 120 communicates with its delivery server 220 and downloads its particular transformed product channel data, the delivery server 220 communicates such a transfer to the delivery module 270. Responsive to such a message, the delivery module 270 can update the log and delete from memory those reports that have been both delivered to the server and received by the enterprise 120. In that manner, should any component in the system fail or be temporarily unavailable, the enterprise can recover data back to the last report it received.

According to another embodiment of the present invention, the delivery module, in conjunction with the rule sets 240 and each delivery server 220, can encrypt the product channel data using a key known only to a particular enterprise. Thus the data residing on the delivery server 220 is both readily available to the enterprise and secure. These and other implementation methodologies for automated product channel data delivery can be successfully utilized by the system 200. According to another embodiment of the present invention a common deliver server 220 can reside apart from the firewall 280 and the system 200 such that each of the plurality of enterprises 120 communicate with the server 220 via secure transmissions. These implementation methodologies are known within the art and the specifics of their application within the context of the present invention will be readily apparent to one of ordinary skill in the relevant art in light of this specification.

Figure 3:
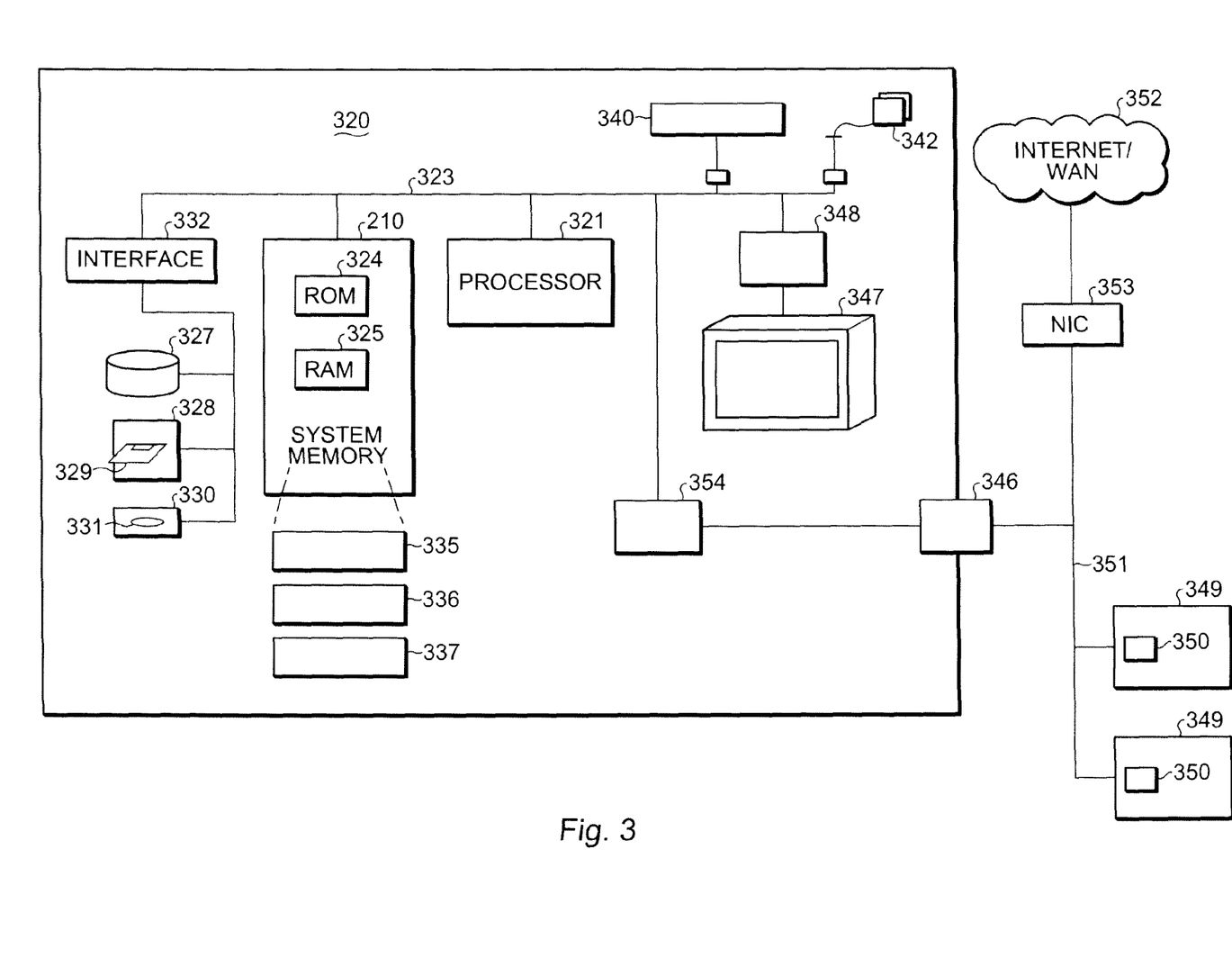
FIG. 3 shows a networked computer environment in which one embodiment of the present invention can be implemented.

FIG. 3 and the following discussion are intended to provide a brief general description of a suitable computing environment in which the present invention may be implemented. Although not required, the invention will be described in the general context of computer-executable instructions, such as program modules, being executed by a personal computer. Generally, program modules include routines, programs, objects, components, data structures and the like that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers and the like, (collectively referred to as computing devices). The invention may also be practiced in distributed computing environments where tasks are performed by remote processing devices that are linked through a communications network. In a distributed computing environment, program modules may be located in both local and remote memory storage devices.

With reference to FIG. 3, an exemplary system for implementing the present invention includes a general purpose computing device in the form of a conventional personal computer 320 or the like, including a processing unit 321, a system memory 322 and a system bus 323 that couples various system components including the system memory 322 to the processing unit 321. The system bus 323 may be any of several types of bus structures including a memory bus or memory controller, a peripheral bus and a local bus using any of a variety of bus architectures. The system memory includes read-only memory (ROM) 324 and random access memory (RAM) 325. A basic input/output system (BIOS), containing the basic routines that help to transfer information between elements within the personal computer 320, such as during start-up, is stored in ROM 324. The personal computer 320 may further include a hard disk drive 327 for reading from and writing to a hard disk (not shown), a magnetic disk drive 328 for reading from or writing to a removable magnetic disk 329 and an optical disk drive 330 for reading from or writing to a removable optical disk 331 such as a CD-ROM or other optical media. The hard disk drive 327, magnetic disk drive 328 and optical disk drive 330 are connected to the system bus 323 by a hard disk drive interface, a magnetic disk drive interface and an optical drive interface 332 (collectively), respectively. The drives and their associated computer-readable media and other storage media as is known to one skilled in the relevant art provides non-volatile storage of computer readable instructions, data structures, program modules and other data for the personal computer 320 and other computing devices. Although the exemplary environment described herein employs a hard disk, a removable magnetic disk 329 and a removable optical disk 331, it should be appreciated by those skilled in the art that other types of computer readable media as is known to one skilled in the art that can store data that is accessible by a computer, such as magnetic cassettes, flash memory cards, digital video disks, RAMs, ROMs and the like may also be used in the exemplary operating environment.

A number of program modules may be stored on the hard disk, magnetic disk 329, optical disk 331, ROM 324 or RAM 325, including an operating system 335, one or more application programs 336, other program modules 337 as described herein and program data 338. A user may enter commands and information into the personal computer 320 or similar computing device through input devices such as a keyboard 340 and pointing device 342. Other input devices (not shown) may include a microphone, joystick, game pad, satellite dish, scanner or the like. These and other input devices are often connected to the processing unit 321 through a serial port interface that is coupled to the system bus, but may be connected by other interfaces, such as a parallel port, game port or universal serial bus (USB). A monitor 347 or other type of display device is also connected to the system bus 323 via an interface, such as a video adapter 348. In addition to the monitor 347, personal computers typically include other peripheral output devices (not shown), such as speakers and printers.

The personal computer 320 may operate in a networked environment using logical connections to one or more remote computers, such as a remote computer 349. The remote computer 349 may be another personal computer, a server, a router, a network PC, a peer device or other common network node and typically includes many or all of the elements described above relative to the personal computer 320, although only a memory storage device 350 has been illustrated in FIG. 3. The logical connections depicted in FIG. 3 include a local area network ("LAN") 351 and a wide area network ("WAN") 352. Such networking environments are commonplace in offices, enterprise-wide computer networks, Intranets and the Internet.

Figure 4:
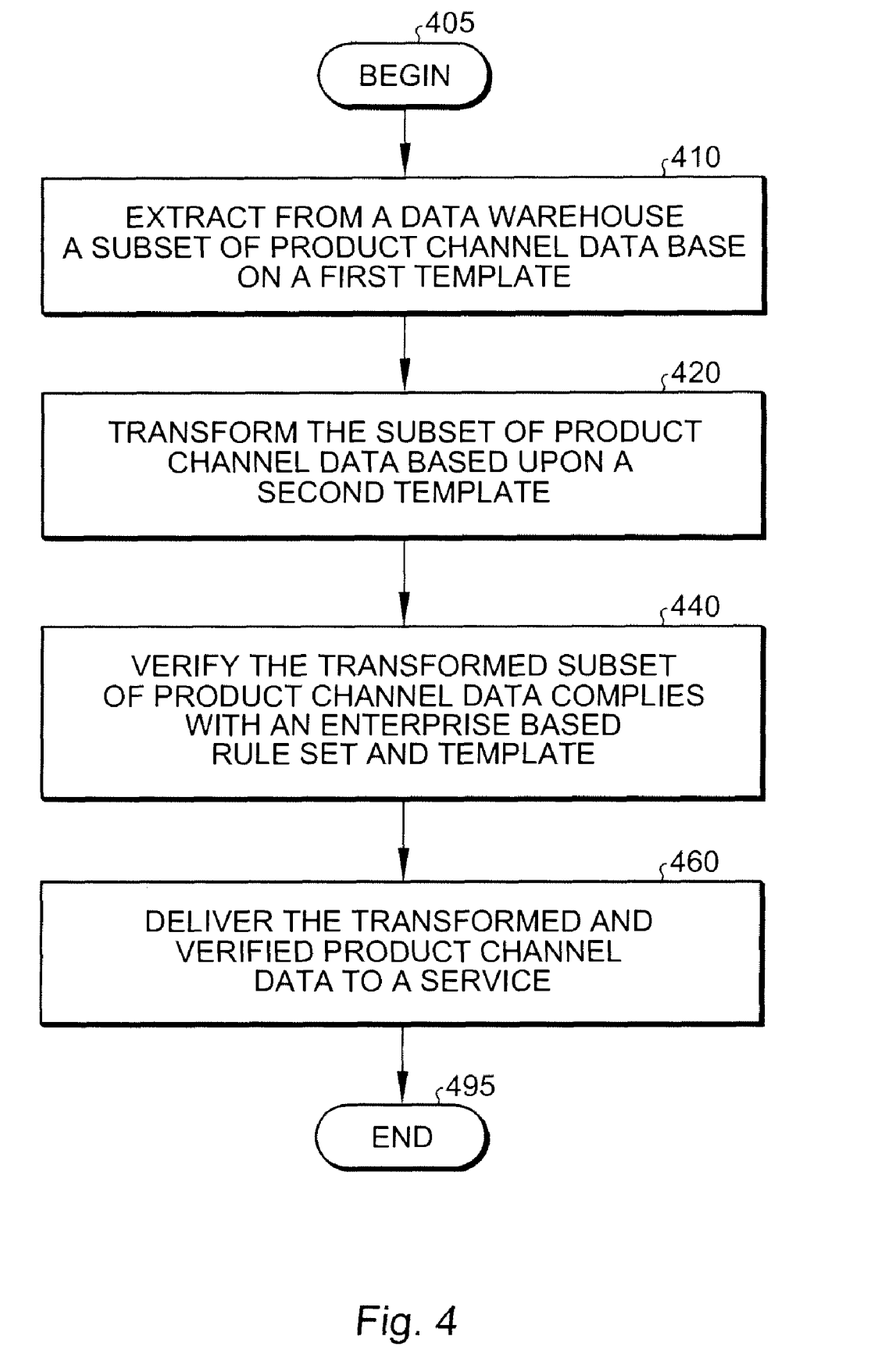
FIG. 4 shows one embodiment of a method for automated delivery of product channel data to an enterprise, according to the present invention.

When used in a LAN networking environment, the personal computer 320 is connected to the local area network 351 through a network interface or adapter 353. When used in a WAN 352 networking environment, the personal computer 320 typically includes a modem 354 or other means for establishing communications over the wide area network 352, such as the Internet. The modem 354, which may be internal or external, is connected to the system bus 323 via the serial port interface 346. In a networked environment, program modules depicted relative to the personal computer 320, or portions thereof, may be stored in the remote memory storage device. It will be appreciated that the network connections shown are exemplary and other means of establishing a communications link between the computers may be used FIG. 4 is a flowchart illustrating methods of implementing an exemplary process for automated delivery of product channel data. In the following description, it will be understood that each block of the flowchart illustrations, and combinations of blocks in the flowchart illustrations, can be implemented by computer program instructions. These computer program instructions may be loaded onto a computer or other programmable apparatus to produce a machine such that the instructions that execute on the computer or other programmable apparatus create means for implementing the functions specified in the flowchart block or blocks. These computer program instructions may also be stored in a computer-readable memory that can direct a computer or other programmable apparatus to function in a particular manner such that the instructions stored in the computer-readable memory produce an article of manufacture including instruction means that implement the function specified in the flowchart block or blocks. The computer program instructions may also be loaded onto a computer or other programmable apparatus to cause a series of operational steps to be performed in the computer or on the other programmable apparatus to produce a computer implemented process such that the instructions that execute on the computer or other programmable apparatus provide steps for implementing the functions specified in the flowchart block or blocks.

Accordingly, blocks of the flowchart illustrations support combinations of means for performing the specified functions and combinations of steps for performing the specified functions. It will also be understood that each block of the flowchart illustrations, and combinations of blocks in the flowchart illustrations, can be implemented by special purpose hardware-based computer systems that perform the specified functions or steps, or combinations of special purpose hardware and computer instructions.

The process generally shown in FIG. 4 begins 405 with the extraction 410 of a subset of data from the product channel participant's data warehouse. This extraction is based on one or more templates originally submitted by an enterprise but verified and, when necessary, modified by the product channel participant. Thereafter the extracted data is transformed 420 into a format compatible with an enterprise system based on, according to one embodiment, a second template. Once extracted and transformed, the system 200 validates and verifies 440 the data to ensure that the subset of transformed data complies with enterprise requirements yet does not reveal proprietary information to which the enterprise is not privy.

Finally the transformed and verified data is delivered 460 to a delivery server where it resides until the enterprise retrieves the data at its convenience thus ending 495 the process. To better understand the process described above, consider the following example. Consider a product channel participant who operates in the cellular telephone market. This particular participant who targets corporate entities as customers not only provides cellular service but also sells a wide variety of cellular phones from a variety of manufacturers i.e. enterprises. Company A and company B both provide cellular phones to the product channel participant. Both company A and company B would like to know to what type of corporation their product is being sold and what type of service plan is being used. They would both also like to know what type of phones and services are being purchased by corporations that did not elect to use their products. The product channel participant possesses this data.

Company A and company B both produce other goods beyond cellular telephones. Thus to assist their internal management process, each phone from company A is preceded by the initials CP for cellular phone. Each phone from company B uses only the letter C attached to the end of the model number for the same reason. As the product channel participant has little need to know that it is selling phones, it removes this nomenclature from the model numbers and adds the letter A and B for company A and B respectively to track which company's phones are the most popular. Thus from the channel participant's perspective a cellular phone from company A model CP0010 becomes 0010A and a phone from company B model 2345C becomes 2345B.

Assume that company A would like to know from the product channel participant how many CP0010 phones have been sold each month, the type and name of the company to which they were sold and the service plan associated with that sale or other sale of goods to that customer. Upon receiving this request, the channel participant recognizes that it has no intention to identify the actual customer of the product for fear that company A will contact them directly and undermine the channel participant's relationship with the customer. The channel participant also sees no obligation to give additional details regarding other goods sold to a customer and may, in some circumstances, be a breach of confidence with other vendors. Thus the product channel participant modifies the requested list of data and creates an extraction template. This template identifies any sale of product 0010A as well as the customer to which it is sold and the service plan associated with that sale, if any. The template is scheduled to run periodically, in this case on a monthly basis.

According to one embodiment of the present invention, as described herein, the data identified by the template is extracted from the channel participant's data warehouse. In this case, the data warehouse indicated that last month 200 0010A phones were sold to one customer. As the nomenclature of the product 0010A is incorrect for company A's purposes, it is transformed to CP0010. In addition, the report shows that the phones were purchased by company C and that company C also purchased 500 2345B phones.

While the data has been transformed to be compatible with company A's systems, it nonetheless includes data which the channel participant does not want to release. According to one embodiment of the present invention, rules are applied to the transformed data to ensure that the data meets not only the requirements of the enterprise but also does not violate any rules of the product channel participant. In this case, the identity of company C is removed as is the identification of the other goods sold to company C. Thus company A's report shows a sale of 200 CP0010 phones to a customer of unknown identity. The report also indicates that the same customer purchased 500 other unidentified phones. The service plan that is associated with the phones is also listed without giving any proprietary information.

Once created and validated, the report is delivered to a server that can be accessed via the Internet by Company A. Once company A downloads the report, a message is sent back to the product channel participant that the data has been received by company A resulting in the release of storage media at the product channel participant's location.

As will be understood by those familiar with the art, the invention may be embodied in other specific forms without departing from the spirit or essential characteristics thereof. Likewise, the particular naming and division of the modules, managers, functions, systems, engines, layers, features, attributes, methodologies and other aspects are not mandatory or significant, and the mechanisms that implement the invention or its features may have different names, divisions and/or formats. Furthermore, as will be apparent to one of ordinary skill in the relevant art, the modules, managers, functions, systems, engines, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver and/or in every and any other way known now or in the future to those of skill in the art of computer programming. Additionally, the present invention is in no way limited to implementation in any specific programming language, or for any specific operating system or environment.

While there have been described above the principles of the present invention in conjunction with automated delivery of product channel data, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features that are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The Applicant hereby reserves the right to formulate new claims to such features and/or combinations of such features during the prosecution of the present application or of any further application derived therefrom.

We claim:

1. A system for automated delivery of channel market data from product channel participants, the system comprising:
    a data warehouse including aggregate product channel data in product channel participant format from a plurality of product channel participants wherein the aggregate product channel data includes sales and inventory data associated with products from a plurality of enterprises;
    a machine operable of executing instructions embodied as software;
    a plurality of software portions stored on the storage medium and executable by the machine, wherein
    one of said software portions is configured to extract from the data warehouse a subset of the aggregate product channel data, the subset comprising product channel data from one or more of the plurality of product channel participants associated with one of the plurality of enterprises;
    one of said software portions is configured to transform the subset of product channel data based on one of a plurality of reporting templates forming a transformed subset of aggregate product channel data;
    one of said software portions is configured to control, by each of the one or more of the plurality of product channel participants, release of corresponding portions of the transformed subset of aggregate product channel data to the one of the plurality of enterprises; and
    one of said software portions is configured to deliver the transformed subset of product channel data to the one of the plurality of enterprises;
    a firewall wherein the storage medium, the data warehouse and the machine operate inside the firewall under the control of at least one of the plurality of product channel participants and is inaccessible by the plurality of enterprises; and
    a server operating outside of the firewall wherein the server is accessible by the one of the plurality of enterprises and configured to receive the transformed subset of product channel data.

2. The system of claim 1 wherein each template identifies desired product channel data and a format for said product channel data.

3. The system of claim 1 wherein each template is based on data requests from the enterprise and is configured to be compatible with the data warehouse.

4. The system of claim 1 wherein content of each template is approved by each product channel participant.

5. The system of claim 1 wherein the firewall prevents unauthorized access to the data warehouse.

6. The system of claim 1 wherein the subset of product channel data is based on at least one of the plurality of reporting templates.

7. The system of claim 1 wherein responsive to transformation of the subset of product channel data, at least one rule verifies that the transformed product channel data includes enterprise required data.

8. The system of claim 1 further comprising a log verifying delivery of transformed product channel data to the one of the plurality of enterprises.

9. The system of claim 1 wherein the storage medium includes reference data supplied by the enterprise and used to verify that transformed product channel data is within an acceptable content range.

10. A computer implemented method for automated delivery of channel market data, the method comprising:
- storing by a plurality of product channel participants in a data warehouse, aggregate product channel data in product channel participant format wherein the aggregate product channel data includes sales and inventory data associated with products from the plurality of enterprises, and wherein a subset of the aggregate product channel data is associated with one of the plurality of enterprises;
- extracting the subset of product channel data from the data warehouse based on a first template from the plurality of reporting templates, the subset comprising product channel data from one or more of the product channel participants;
- transforming the subset of product channel data based on a second template from the plurality of reporting templates forming a transformed subset of aggregate product channel data;
- controlling by each of the plurality of product channel participants release of corresponding portions of the transformed subset of aggregate product channel data to the one of the plurality of enterprises;
- delivering released portions of the transformed subset of aggregate product channel data to a server; and
- accessing at the server by the one of the plurality of enterprises, transformed product channel data.

11. The method of claim 10 wherein extracting includes identifying specific product channel data desired by the enterprise.

12. The method of claim 10 wherein each reporting template is configured to be compatible with the data warehouse.

13. The method of claim 10 further comprising validating each reporting template by the product channel participant.

14. The method of claim 13 wherein extracting, transforming and validating occur within the confines of a firewall controlled by the plurality of product channel participants.

15. The method of claim 14 wherein a wide area network is interposed between the server and the firewall and wherein the wide area network includes the Internet.

16. The method of claim 10 further comprising encrypting the transformed product channel data prior to being delivered to the server.

17. The method of claim 10 wherein, responsive to transformation of the subset of product channel data, verifying transformed subset of aggregate product channel data includes only data required by the enterprise.

18. The method of claim 10 further comprising maintaining a log of delivery verification of released transformed subset of aggregate product channel data to the server.

19. The method of claim 10 wherein delivering includes comparing released transformed subset of aggregate product channel data to reference data supplied by the enterprise to verify that the transformed product channel data is within an acceptable content range.

20. A non-transitory computer-readable storage medium tangibly embodying a program of instructions executable by a machine wherein said program of instructions comprises a plurality of program codes for automated delivery of channel market data, said program of instructions comprising:
- one of said program codes for storing by a plurality of product channel participants in a data warehouse aggregate product channel data in a product channel participant format wherein the aggregate product channel data includes sales data associated with products from the plurality of enterprises, and wherein a subset of the aggregate product channel data is associated with one of the plurality of enterprises;
- one of said program codes for extracting the subset of product channel data from the data warehouse based on a first template from the plurality of reporting templates, the subset comprising product channel data from one or more of the product channel participants;
- one of said program codes for transforming the subset of aggregate product channel data based on a second template from the plurality of reporting templates forming a transformed subset of aggregate product channel data;
- one of said program codes for controlling by each of the plurality of product channel participants release of corresponding portions of the transformed subset of aggregate product channel data to the one of the plurality of enterprises;
- one of said program codes for delivering released portions of the transformed subset of aggregate product channel data to a server; and one of said program codes for accessing at the server by the one of the plurality of enterprises, transformed channel product data.

* * * * *